United States Patent [19]

Rodgers

[11] Patent Number: 4,682,920
[45] Date of Patent: Jul. 28, 1987

[54] ROTATING AIR BEARING

[75] Inventor: James E. Rodgers, Kenton, Ohio

[73] Assignee: United Aircraft Products, Inc., Dayton, Ohio

[21] Appl. No.: 644,094

[22] Filed: Mar. 26, 1986

[51] Int. Cl.$^4$ .......................... B23C 1/02; F16C 39/06
[52] U.S. Cl. ....................................... 409/231; 279/4; 384/107
[58] Field of Search ............... 409/231, 232, 233, 234; 279/4 R, 2 A; 384/100, 107, 114; 308/DIG. 13

[56]  References Cited
U.S. PATENT DOCUMENTS

| | | | |
|---|---|---|---|
| 2,754,641 | 7/1956 | Bidwell | 384/107 |
| 2,756,114 | 7/1956 | Brunzel | 384/107 |
| 2,756,115 | 7/1956 | Michel | 384/114 |
| 2,877,066 | 3/1959 | Baumeister | 384/107 |
| 3,058,559 | 10/1962 | Ohrnberger | 405/231 X |
| 3,806,208 | 4/1974 | Bruck | 384/107 |
| 4,332,428 | 6/1982 | Maruyama | 384/100 X |

Primary Examiner—William R. Briggs
Attorney, Agent, or Firm—J. E. Beringer

[57] ABSTRACT

An improvement in a machine tool or the like in which a work piece is held in a collet driven in a rotary sense and subject also to axial movements in which the work piece is gripped and released. A collet operating mechanism includes a frictionless air bearing allowing endwise movements and high speed rotation.

13 Claims, 4 Drawing Figures

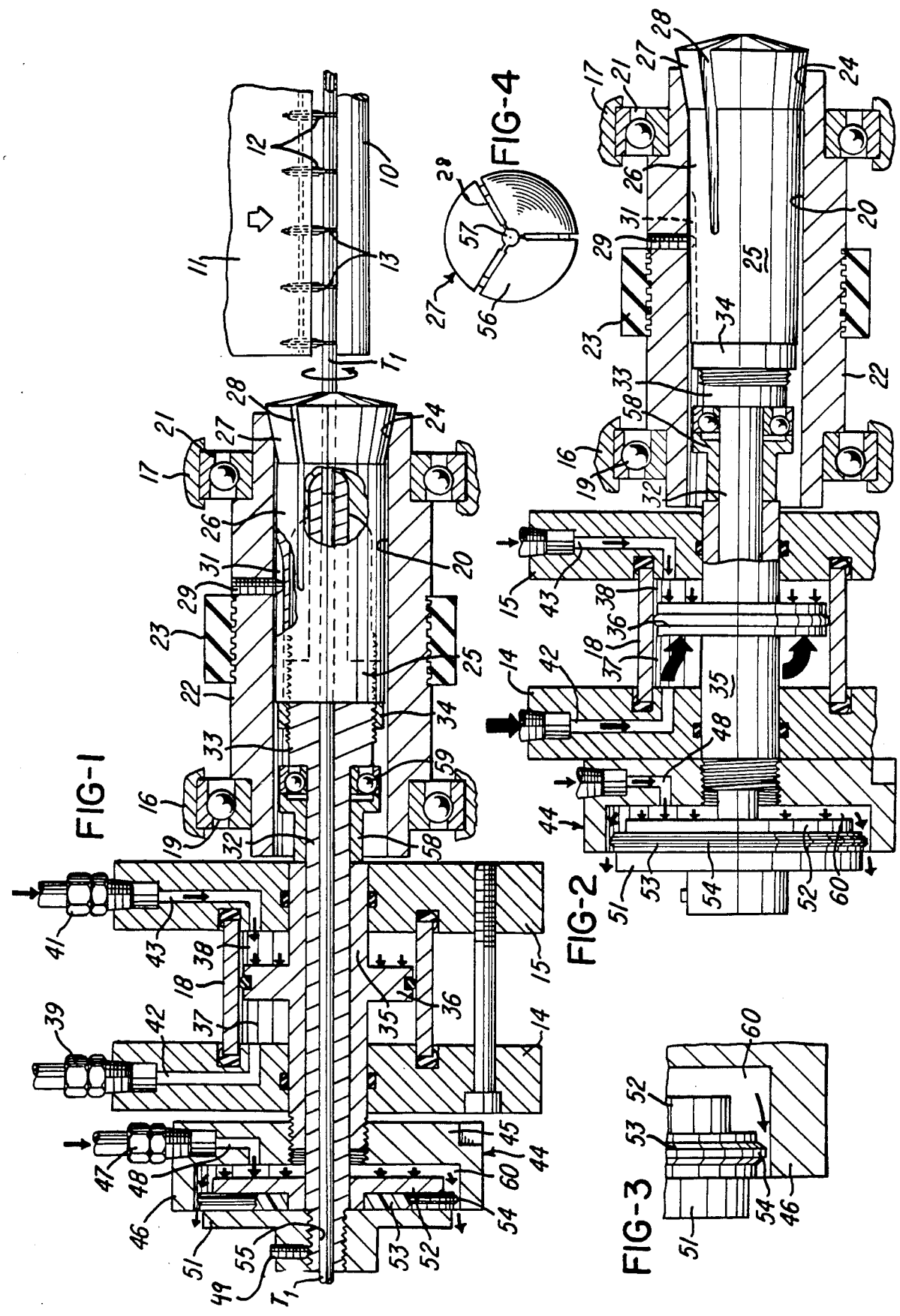

ROTATING AIR BEARING

BACKGROUND OF THE INVENTION

1. Field of the Invention

This invention relates to machine or like tools in which a work piece is rotated at high speed and alternately gripped and released in connection with feeding movements into and out of the tool.

2. Description of the Prior Art

A known tool operates on successive lengths of tubing to form circular beads or indentations thereon. A length of tube is held in to project from a collet rotated as a part of the tube working process. The collet is capable also of axial or endwise motions in the course of which a worked tube is ejected and a succeeding tube length introduced into to be held by the collet. The combination of forces involved in high speed rotation (as on the order of 12,000 R.P.M.), in endwise shifting motions and in working stresses as applied to a projecting work piece have been found to be destructive of bearings in which moving parts are mounted, particularly with repsect to a bearing remote from the working area. The necessity for frequent shut-downs of tool operation, while a machine bearing is removed and replaced, has added considerably, and undesirably, to production costs.

SUMMARY OF THE INVENTION

The instant invention has in view the substitution of a generally new form of bearing. While specifically applicable to a machine tool as discussed above, the bearing is generally useful in machine structures combining rotary and axial motions. In one aspect, the invention resides in the bearing itself including supported movable parts and actuating means. According to a feature of the invention the improved bearing incorporates in itself a part of the acutating means.

A tool construction, according to the disclosed embodiment of the invention, provides a shaft supported for rotary and axial motions. At one end of the shaft is a work holding collet contractible and expansible in response to axial shaft movements to grip and to release a work piece. The work piece is introduced into the collet from an opposite end of the shaft. A bearing at such opposite end supports the shaft in its rotary and axial movements and absorbs operationally induced lateral stresses as well. The bearing excludes a use of mechanical rolling bearing elements. It utilizes instead a continuously flowing stream of air which provides a friction free relationship between rotating and non-rotating parts while establishing and maintaining an axial alignment of the shaft. The bearing is self-cooling. A portion thereof presents itself as a piston surface assisting in axial shaft movements.

An object of the invention is to provide a rotary air bearing substantially as set forth.

Other objects and structural details of the invention, in its illustrated embodiment, will appear from the following description when read in connection with the accompanying drawings, wherein:

FIG. 1 is a view in longitudinal section, and partly diagrammatic of a rotating air bearing, parts being shown in work piece gripping position;

FIG. 2 is a view like FIG. 1, parts being shown in a work piece releasing position;

FIG. 3 is a fragmentary enlarged view of a bearing portion; and

FIG. 4 is a detail end view of a collet.

Referring to the drawings, the invention is for illustrative purposes shown as embodied in a tool for forming beads or circular indentations in heat exchange tubes.

In a tube so formed, fluid flow is repeatedly constricted in a pattern of restriction inducing a thorough scrubbing of the tube wall by the flowing fluid. A degree of heat transfer efficiency higher than that obtainable in a straight walled tube is achieved. Only so much of the tool structure is shown as is thought necessary for an understanding of the invention.

In FIG. 1 a beading operation is shown diagrammatically as taking place with respect to a tube $T_1$. A support roller 10 positions opposite a head 11 carrying rollers 12. A tube $T_1$ is fed to a position of support on roller 10 and rotated at high speed, as for example a speed on the order of 12,000 R.P.M. The head 11 is moved in a direction to approach roller 10. In the process, rollers 12 engage the tube $T_1$ and form a longitudinal series of circular indentations 13. Upon the head 11 being raised or moved away from the roller 10, the tube $T_1$ is ejected and followed to the working position illustrated by a succeeding tube $T_2$.

A mechanism to rotate a tube, to position it in a secure axial alignment and to allow for its feed to and from a working position is comprised in a machine which includes stationary frame elements 14 and 15 and stationary bearing mounts 16 and 17. The frame elements 14 and 15 are made separable in order that they may support between them a cylinder 18. The mounts 16 and 17 position axially of one another forwardly of frame elements 14 and 15 or between the frame elements and the working position as occupied by roller 10. The longitudinally displaced bearing mounts respectively contain relatively heavy rolling bearings 19 and 21. Rotatably supported in the bearings 19 and 21 is a tubular drive sleeve 22. A belt 23, driven from an external power source, engages the sleeve periphery and is responsible for its powered rotation.

The sleeve 22 positions perpendicularly of frame elements 14 and 15 and in axial alignment with cylinder 18. Its interior through bore 20 terminates at what may be considered an outer end in an expanding, tapered surface 24. Within the bore 20, and having a portion cooperative with surface 24, is a collet 25. The collet 25 has a cylindrical body portion 26, and, at one end a gradually expanding head portion 27. The collet is installed in bore 20 through the outer end thereof and is essentially self-centering therein. Head portion 27 has a cooperative relation with surface 24, its sloping exterior corresponding substantially with the slope of taper 24. The collet has slots 28 of longitudinal extent opening through the head portion 27. The split construction of the collet allows for its radial expansion and contraction and it will be evident that those motions occur responsively to interaction between taper 24 and the sloping exterior of head 27 as the collet adjusts axially outwardly and inwardly relative to drive sleeve 22.

The drive sleeve 22 has a driving-driven relation to the collet 25, there being a screw stud 29 carried by the sleeve which projects into a groove 31 in the outer surface of the collet body 26. The collet accordingly rotates in unison with the drive sleeve. The groove 31 has an elongated configuration whereby the collet is permitted axial motion relative to the drive sleeve while continuing to be rotatively driven thereby.

The collet 25 has an interior bore and is internally threaded at its inner end or that end opposite head portion 27. A shaft 32 disposes coaxially of the collet and projects into the collet bore. A radially enlarged portion 33 of the shaft 32 is externally threaded and makes a screw connection with the collet. The shaft and collet accordingly are joined together for unison rotary and axial motions. An internally threaded ring 34 on shaft portion 33 is adjustable to act as a stop for collet 25 and so fix the relative longitudinal positions of the shaft and collet.

The shaft 32 extends leftwardly or rearwardly from the collet and has a long bearing in a sleeve 35 which is in turn installed in through apertures in stationary frame elements 14 and 15. Sleeve 35 projects axially through the cylinder 18 and is a part of a piston-sleeve assembly further including a piston 36 reciprocable in the cylinder. In a sliding, sealed engagement with the surrounding wall of cylinder 18, the piston 36 forms with frame element 14 a pressure fluid chamber 37 and with frame element 15 a pressure fluid chamber 38. In the respective frame elements 14 and 15 are pressure fluid line fittings 39 and 41, as well as related fluid flow passges 42 and 43 leading respectively to chambers 37 and 38.

The sleeve 35 extends through and beyond the frame element 14 and has threaded engagement with a bearing housing 44. the latter is comprised of a flat base portion 45 in a parallel, adjacent relation to frame element 14. A peripheral flange 46 projects from base portion 45, in a direction away from frame element 14, effectively recessing the housing to its one side. A pressure fluid line fitting 47 is installed in the bearing housing and connects by an interior passage 48 to the recessed area of the housing.

The shaft 32 extends through and beyond sleeve 35 into and through the base of bearing housing 44. Screw threaded onto the projecting shaft end, and fixed thereto by a screw stud 49, is a disc-like plate 51. The plate 51 is a part of a piston-like bearing assembly further including a plate 52 and an intervening non-metallic annulus 53. The assembly comprising parts 51, 52 and 53 is made unitary by connectors not here shown. The annulus 53 is made of a relatively wear resistant plastic and is in radially projecting relation to both plates 51 and 52. The bearing assembly comprising parts 51, 52 and 53 is substantially received in the recessed bearing housing 44 to be surrounded by flange 46 and maintained thereby in the housing axis. A projecting peripheral rib 54 on annulus 53 is in an approaching closely spaced relation to the interior flange wall which in turn is in a parallel relation to the axis of shaft 32. Further, the bearing assembly forms, with base 45 of the bearing housing a pressure fluid chamber 60. In the chamber 60, pressure fluid is applied to the bearing assembly in a direction to urge it and connected shaft 32 leftwardly.

The shaft 32 is formed with a through longitudinal bore 55 which receives and aligns work pieces as represented by the tubes $T_1$ and $T_2$. Thus, a tube as $T_1$, is fed into the bore 55 and followed by a second tube $T_2$. Under the urging of the latter, tube $T_1$ is advanced into and through the collet 25. A major part of the length of the tube $T_1$ is projected into the work station as represented by parts 10 and 11 while a minor portion remains in the collet to be gripped by head portion 27. The shaft 32 extends within the collet 25 substantially to head portion 27. The outer end of the collet, or more particularly of head portion 27 is constructed as a conical surface 56 about a central aperture 57 through which tube lengths emerge.

The fittings 39, 41 and 47 are connected to a source of fluid under pressure which may conveniently be compressed air. By means of reducing valves or the like the air pressure of the air brought to fittings 41 and 47 is low in comparison to the pressure of the air brought to fitting 39. Further, the line leading to fitting 39 includes a valve suitably operated to connect pressure chamber 37 alternately to the pressure source and to exhaust. In the operation of the tool, assuming chamber 37 to be connected to exhaust, fluid pressure in chamber 38 is effective to move the bearing assembly 51-53, and shaft 32 to which is it connected, in a direction to draw collet 25 into drive sleeve 22. (FIG. 1) In the course of this motion, collet head 27 rides down taper 24 and is contracted to grip the portion of tube $T_1$ which it surrounds. While the tube is so gripped, and by reason of the rotary drive imparted by sleeve 22, the tube is turned rapidly in its work station and indentations 13 are formed. At the conclusion of the indenting operation, pressure chamber 37 is disconnected from exhaust and connected to the pressure source. Relatively high pressure air is admitted to chamber 37 (FIG. 2), the level of pressure as applied to a face of piston 36 being sufficient to overcome opposing pressures as applied in chamber 38. The piston-sleeve assembly 35-36, and connected bearing housing 44, are moved outward or to the right as seen in the drawings, such motion being appropriately limited as by contact of the bearing housing with frame element 14. Motion of the piston-sleeve assembly in the described direction is transmitted to the shaft 32 through an interponent sleeve 58 and bearing 59 which position between one end of the piston-sleeve assembly and shaft enlargement 33. As a consequence, when the piston-sleeve assembly moves under the urging of pressure fluid in chamber 37 it carries with it shaft 32 and attached collet 35. Projection of the collet causes head portion 27 to ride up taper 24, allowing the collet to expand and release its grip on tube $T_1$. When this occurs, and by means external to the tool, another tube is fed into bore 55, ejecting tube $T_1$ and moving tube $T_2$ into position to be worked. As before, a trailing end of tube $T_2$ remains in the collet. Now chamber 37 is reconnected to exhaust and parts are restored to control of the pressure fluid in chamber 38. The collet 25 is pulled inwardly, as from the position of FIG. 2 to the position of FIG. 1, and tube $T_2$ is locked to the collet for rotation with it.

There is no significant relative axial motion between the bearing housing 44 and the bearing asssembly 51-53. The fluid pressure in chamber 60 in reacting on the bearing member and on the bearing housings tends to maintain an illustrated relationship of parts in which bearing assembly 51-53 and bearing housing 44 are in a separated relation and in which piston sleeve 35 is in end abutted engagement with interponent 58. Such pressure acts also as a resilient link between the bearing housing and the bearing assembly in the collet locking or closing operation and cushions any attempted overtravel of the piston assembly as may occur in such operation. Chamber 60 also provides a reservoir of pressure fluid from which a portion escapes continuously around the periphery of bearing annulus 53. The rib 54 on annulus 53 accordingly is separated from the surrounding wall of housing flange 46 by a thin film of flowing fluid.

The rib makes a substantially line contact with the tube wall with, however, some separation of the parts as indicated in the somewhat exaggerated showing of FIG. 3. The relationship of the bearing assembly and bearing housing accordingly is such as to provide an effective bearing for shaft 32 at its outer end by means which are essentially frictionless and self-cooling. Forces generated by high speed rotation, by a relatively extended rotating shaft and by relatively remote application of working stresses are not applied in bearing destruction. The fluid or air bearing supports and maintains alignment through the shaft and collet assembly while such assembly engages in endwise movements and while rotating at high speeds, as at 12,000 R.P.M. The air bearing is completely controlled by air and has two loads constantly on it, an end load and a side load. Precise alignment of parts is essential not only to avoid machine mis-operation but to avoid tube deformation. The tubes are required to be perfectly straight when worked on and when assembled into a heat exchanger.

It will be obvious that the invention lends itself to structural modification and it is the intent that the invention scope should extend to and comprehend all reasonable interpretations of claims to follow.

What is claimed is:

1. In a machine or like tool, a shaft adapted for rotary and axial shifting motions, intermediate support means for said shaft, said shaft extending in opposite directions from said support means, a fluid bearing for one extended end of the shaft including a bearing housing recessed to provide a fluid reservoir, and a piston-like bearing recessed in said housing and mounted on to move with said shaft, said bearing having a peripheral portion in an approaching relation to an interior surrounding wall of said housing whereby substantially to hold said housing and said shaft in a centered relation and whereby to define a wall of said reservoir, and a pressure fluid distributing and operating system including means for admitting pressure fluid to said reservoir, and means for reciprocating said bearing housing in an axial sense, the fluid in said reservoir being allowed to escape to ambient surroundings around the periphery of said piston-like bearing for an essentially frictionless contact of said peripheral portion with said housing wall and being used as a resilient link in actuating said shaft in one axial direction, said bearing housing being supported from said intermediate support means to be free of rotation with said shaft.

2. In a machine or like tool, a shaft adapted for rotary and axial shifting motions, intermediate support means for said shaft, said shaft extending in opposite directions from said support means, a fluid bearing for one extended end of the shaft including a bearing housing recessed to provide a fluid reservoir, and a piston-like bearing recessed in said housing and mounted on to move with said shaft, said bearing having a peripheral portion in an approaching relation to an interior surrounding wall of said housing whereby substantially to hold said housing and said shaft in a centered relation and whereby to define a wall of said reservoir, and a pressure fluid distributing and operating system including means for admitting pressure fluid to said reservoir, the fluid in said reservoir being allowed to escape to ambient surroundings around the periphery of said piston-like bearing for an essentially frictionless contact of said peripheral portion with said housing wall, said shaft having a through longitudinal bore, work pieces being introduced into said bore at said one extended end of the shaft and advanced therein to project therefrom at the opposite extended end of the shaft, a collet carried by said shaft at said opposite extended end thereof, and means utilizing to and from longitudinal shifting motions of the shaft to cause said collet to grip a projected work piece for rotation with said shaft and to release a projected work piece.

3. Rotating shaft bearing means as in claim 2, said collet positioning in a rotary drive sleeve and said last named means including cooperating surfaces on said collet and said drive sleeve.

4. In a machine or like tool, a shaft adapted for rotary and axial shifting motions and providing a guide for successive work pieces to be advanced therealong, a collet carried by said shaft, means utilizing to and fro axial shifting motions of said shaft to cause said collet to grip and to release successively advanced work pieces, a gripped work piece projecting from said collet for rotation with rotary motion of the shaft, bearing means for said shaft including a bearing housing longitudinally displaced from said collet and a piston-like bearing on said shaft received in said housing to be surrounded thereby, means for admitting pressure fluid to said bearing housing which fluid escapes to ambient from said housing around the periphery of said piston-like bearing for an essentially friction free relationship of said bearing periphery to said housing, a support structure for said bearing housing supporting said bearing housing for axial shifting motions and including pressure fluid operated means for axially shifting said bearing housing, the pressure fluid admitted to said bearing housing being applied as a resilient line between said bearing and said bearing housing.

5. Rotating shaft bearing means as in claim 4, said support structure providing a relatively stationary cylinder, and said pressure fluid operated means including a piston in said cylinder and a sleeve united with said piston and surrounding said shaft, said sleeve at one end carrying said bearing housing and at its other end being operatively applied to a shaft portion.

6. Rotating shaft bearing means as in claim 5, and means for admitting pressure fluid to said cylinder for application to said piston.

7. In a machine or like tool, a shaft adapted for rotary and axial shifting motions, a collet carried by said shaft to grip a work piece for rotation with the shaft and to release a work piece, means utilizing to and from axial motion of said shaft to effect gripping and releasing actions of said collet, shaft bearing means longitudinally displaced from said collet including a non-rotating axially displaceable recessed bearing housing and a piston-like bearing member substantially received in said housing and fixed to said shaft, and means for admitting pressure fluid into said bearing housing to apply reactant pressures between said housing and said bearing member with pressure fluid escaping to ambient around the periphery of said bearing member for an essentially frictionless contact of a peripheral portion of said bearing member with a surrounding housing wall.

8. Rotating shaft bearing means as in claim 7, said bearing member having a disc-like configuration with one side face exposed to the pressure fluid in said housing and the other side face exposed to ambient surroundings and the peripheral portion thereof being in a closely approaching relation to said surrounding housing wall.

9. Rotating shaft bearing means as in claim 8, the peripheral portion of said bearing member including a rib projecting radially as an annulus intermediately of said side faces.

10. Rotating shaft bearing means as in claim 7, and means for axially reciprocating said housing, said reciprocating means utilizing the reactant pressures between said bearing member and said bearing housing as a resilient link to activate said shaft in one axial direction and said reciprocating means being applied directly to actuate said shaft in an opposite axial direction.

11. Rotating shaft bearing means as in claim 1, wherein said means for reciprocating has a directly actuating relation to said shaft to actuate said shaft in an opposite direction, fluid pressure in said reservoir being further used as a reactant means tending to maintain said means for reciprocating in a position to actuate said shaft.

12. Rotating shaft bearing means as in claim 11, said means for reciprocating including a cylinder comprised in said support means and a piston-sleeve assembly including a piston in said cylinder and a sleeve longitudinally slidable in said support means and through which said shaft passes, said sleeve carrying said bearing housing and being in an actuating relation to said shaft, and means for admitting pressure fluid to said cylinder to act on said piston therein.

13. Rotating air bearing means as in claim 4, the pressure fluid admitted to said bearing housing being further used to maintain said pressure fluid operated means in an actuating relation to said shaft, axial shifting motion of said bearing housing in one direction as effected by said pressure fluid operated means acting through said resilient link to shift said shaft axially in one direction and said pressure fluid operated means in effecting shifting motion of said housing in an opposite direction acting on said shaft to shift it in an opposite direction.

* * * * *

UNITED STATES PATENT AND TRADEMARK OFFICE
CERTIFICATE OF CORRECTION

PATENT NO. : 4,682,920

DATED : July 28, 1987

INVENTOR(S) : James E. Rodgers

It is certified that error appears in the above-identified patent and that said Letters Patent is hereby corrected as shown below:

On the title page, item [21] Appl. No.: "644,094" should read --844,094--.

Signed and Sealed this

Seventeenth Day of March, 1992

Attest:

HARRY F. MANBECK, JR.

*Attesting Officer*      *Commissioner of Patents and Trademarks*